US011899821B1

(12) United States Patent
Anderson et al.

(10) Patent No.: US 11,899,821 B1
(45) Date of Patent: Feb. 13, 2024

(54) PREVENT CAPTURE OF A DISPLAYED OBJECT ON A MOBILE DEVICE

(71) Applicant: OSOM Products, Inc., Cupertino, CA (US)

(72) Inventors: Gary Anderson, San Mateo, CA (US); Nicholas Franco, San Jose, CA (US); Jason Sean Gagne-Keats, Cupertino, CA (US); Wolfgang Wesley Muller, San Francisco, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/326,790

(22) Filed: May 31, 2023

(51) Int. Cl.
H04M 1/22 (2006.01)
G06F 21/62 (2013.01)
G09G 3/20 (2006.01)

(52) U.S. Cl.
CPC ....... G06F 21/6245 (2013.01); G09G 3/2003 (2013.01); G09G 2320/0666 (2013.01); G09G 2340/0435 (2013.01)

(58) Field of Classification Search
CPC .............. G06F 21/6245; G09G 3/2003; G09G 2320/0666; G09G 2340/0435

USPC .......................................................... 726/26
See application file for complete search history.

(56) References Cited

U.S. PATENT DOCUMENTS

2017/0064059 A1* 3/2017 Kumar B.S. ............ G06F 3/147
2018/0285592 A1* 10/2018 Sharifi .................... G06F 21/84
2021/0142121 A1* 5/2021 Sivakumar ............. G06V 20/54

* cited by examiner

Primary Examiner — Jeffrey C Pwu
Assistant Examiner — Nega Woldemariam
(74) Attorney, Agent, or Firm — Perkins Coie LLP; Alberto Araiza; Lena Petrovic

(57) ABSTRACT

The system obtains information to send to the first user device and converts the information into a sequence of images, where one or more images in the sequence of images include the information, and a remainder of images in the sequence include a visual unrelated to the information. The number of the one or more images and the number of the remainder of images indicate a display frequency. The number of the remainder of images is greater than the number of the one or more images. The display frequency causes an observer to form a perception of the one or more images. The system sends the sequence to the first user device and causes the first user device to present on the display screen the sequence at the display frequency, which causes a garbling of a recording of the display screen associated with the first user device.

18 Claims, 6 Drawing Sheets

PREVENT CAPTURE OF A DISPLAYED OBJECT ON A MOBILE DEVICE

BACKGROUND

Mobile devices with image-capture functions are ubiquitous. They can capture photographs and often record video of the surroundings using one or more built-in digital cameras. In addition, the mobile device cameras can perform digital as well as optical zoom. These same mobile devices can also display various content associated with the user, some of which may be sensitive. If user A is in a public place while viewing sensitive content on their mobile device, user B can record the display screen of user A, thus recording user A's private information, which can include text messages, images, or any kind of visual information.

BRIEF DESCRIPTION OF THE DRAWINGS

Detailed descriptions of implementations of the present invention will be described and explained through the use of the accompanying drawings.

Figure 1:
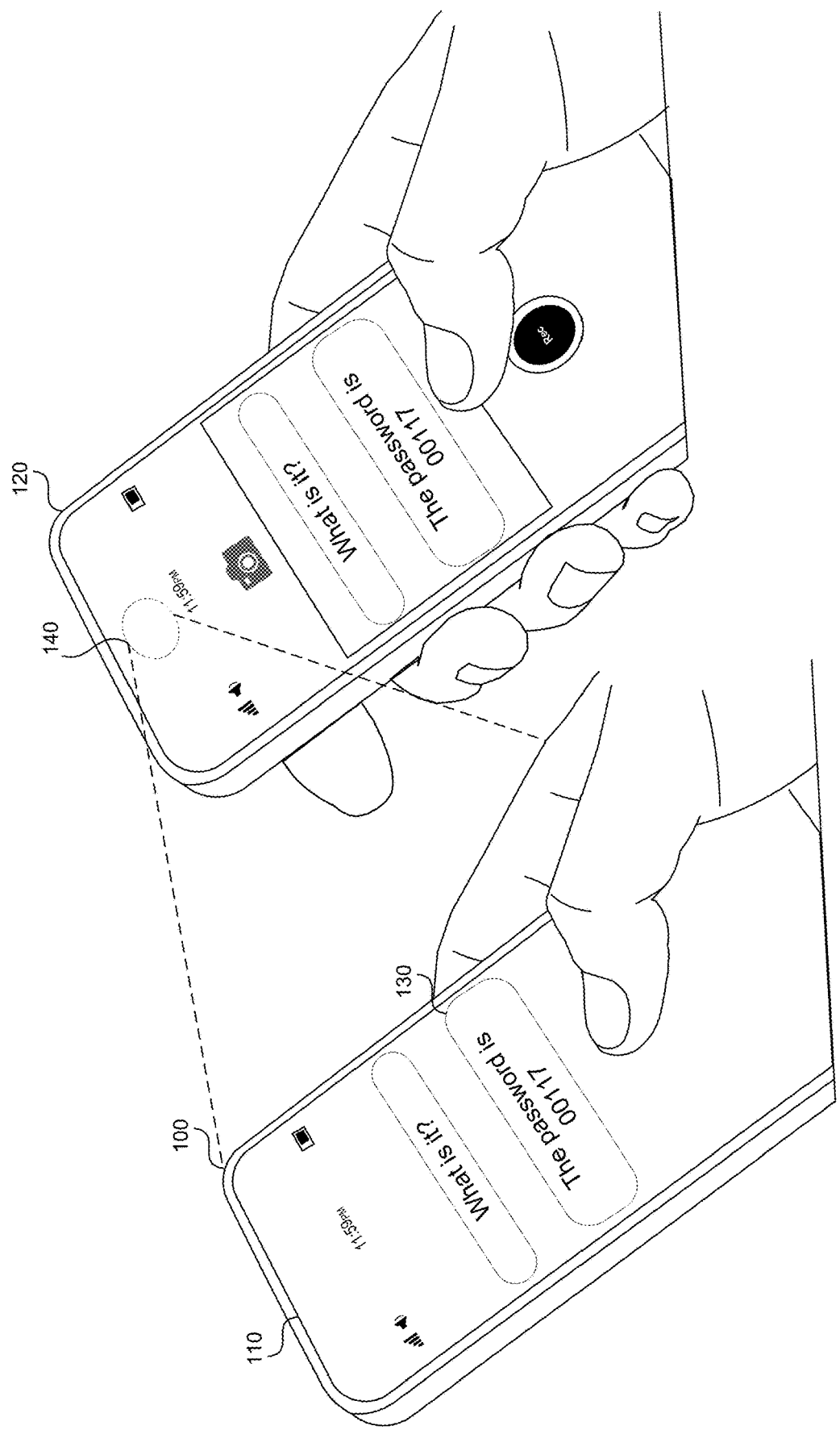
FIG. 1 shows a second user device recording the screen of the first user device.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system prevents recording of information displayed on a mobile device. The system obtains information to send to the mobile device, where the information is configured to be presented on the display screen of the mobile device. The information can be visual information such as a text, a video, or an image. The system converts the information into a sequence of images such as animated gifs or videos, where one or more images in the sequence of images include the information, and the remainder of images in the sequence of images include a visual unrelated to the information, such as a blank screen, white noise, a predetermined pattern such as crosshatch, etc. The number of the one or more images and the number of the remainder of images indicate a display frequency associated with the information. The number of the remainder of images is greater than the number of the one or more images. The display frequency exceeds an exposure time associated with an image-capture device, thus making it unlikely for the image-capture device to record the information. However, the display frequency is such that an observer can form a perception of the one or more images, as described in this application.

The system sends the sequence of images to the mobile device. The system causes the mobile device to present, as an object on the display, the sequence of images at the display frequency associated with the information, where the display frequency associated with the information causes a garbling of a recording of the information displayed on the mobile device, thereby enhancing the privacy of the information. The remainder of the display screen of the mobile device is not garbled, and can be captured in a recording.

In addition, the visual information can include an indication that the visual information is private. Based on the indication of privacy, the mobile device can disable screen capture function when the visual information is presented on the screen of the mobile device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Prevent Recording of a Display Screen of a Mobile Device by a Different Mobile Device FIG. 1 shows a second user device 120 recording the screen of a first user device 100. The first and second user devices 100, 120 can each be a mobile phone, a laptop, a wearable device, or any other digital device having a display screen.

When the user is in a public place, the display screen 110 of the user device 100 may be visible to other people in the area, despite the user being unaware that other people are observing the display screen. Other people can use their user devices 120 to record the display screen 110 of the user device 100. This scenario is especially problematic when the first user device 100 is displaying information 130 that is sensitive, such as passwords, banking information, Social Security numbers, etc. The information 130 can include visual information such as text including alphanumeric characters and/or images.

The disclosed system can prevent a light sensor 140, such as a camera, of the second user device 120 from recording the display screen 110 of the first user device 100, by adjusting the frequency at which the information 130 is displayed. The system can adjust the frequency by creating an animated sequence of images, or by adjusting the refresh rate of the display screen 110, as described in this application. The refresh rate is the frequency with which the image on the display screen 110 is refreshed, usually expressed in hertz (Hz).

Figure 2:
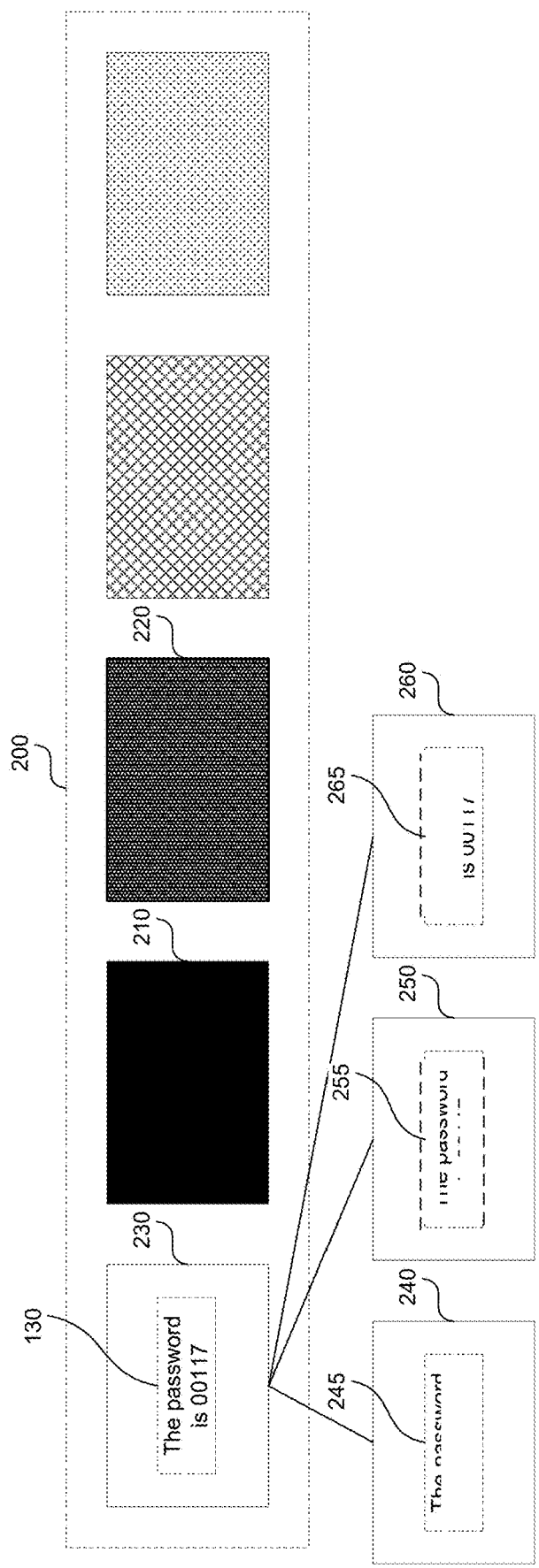
FIG. 2 shows an animated sequence of images.

FIG. 2 shows an animated sequence of images. The animated sequence of images 200 can include the information 130, as well as dummy images 210, 220 (only two labeled for brevity), which contain a visual unrelated to the information. The visual unrelated to the information can garble a recording of the display screen 110 in FIG. 1, while not obfuscating the perception of the information 130 by a viewer.

For example, the sequence 200 can be shown within a span of one second. The animated sequence of images 200 can include multiple images 230 (only one labeled for brevity) of the information 130 in the sequence 200, such as 10 to 30 images of the information 130, that are shown within the span of one second. A human eye can form a stable picture of the image when shown an image at least 10 times a second. The rest of the images 210, 220 in the sequence can include visuals not containing information 130. For example, the rest of the images 210, 220 can be one or more of a solid color, can be a pattern, or a noise, etc.

In the sequence 200, one or more images 230 can be the image of the information 130, while the remainder of images can be the images 210, 220. The one or more images 230 can be shown for a total of one-tenth of a second. That way the human eye can perceive the information 130, however a camera 140 in FIG. 1 associated with the second user device 120 in FIG. 1 has a low likelihood of recording the information 230. For example, every tenth image in the sequence can be the image 230, where each image is shown for one-hundredth of a second. Alternatively, only one image in the sequence can be the image 230, where that image is shown for one-tenth of a second. Further, every hundredth image can be the image 230, where each image is shown for one-thousandth of a second. The final effect is that the one or more images 230 are shown for a total of one-tenth of a second, while the dummy images 210, 220 are shown for nine-tenths of a second.

Specifically, the camera 140 of the second user device 120 has a default exposure time, which is usually one-sixtieth of a second. In other words, the camera 140 records for one-sixtieth of a second. Given that the image 230 containing the private information is shown nine times less frequently than the dummy images 210, 220, the likelihood that the camera 140 recording for only one-sixtieth of a second will record the private information contained in the image 230 is low. It is nine times more likely that the camera 140 of the second user device 120 records the dummy images 210, 220, thus increasing the privacy of the information contained in the information 130. Further, even if the camera 140 records the portion of the sensitive information, the camera records both the image 230 and the dummy images 210, 220 that fade out the sensitive information.

The image 230 can be split into multiple images, where each image 240, 250, 260 contains a portion 245, 255, 265, respectively, of the sensitive information 130. In that case, the total time each image 240, 250, 260 can be shown for is one-tenth of a second. The viewer's eye can form the image 230 by integrating information contained in each image 240, 250, 260.

Figure 3:
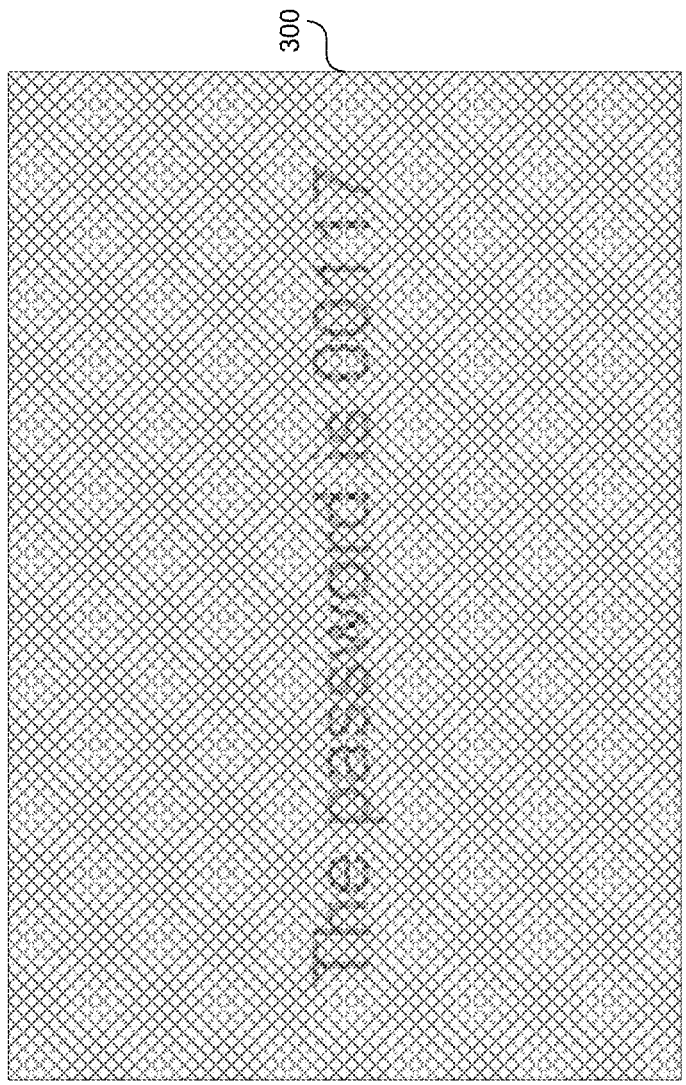
FIG. 3 shows the fading out of the sensitive information, using techniques described in this application.

FIG. 3 shows the fading out of the sensitive information, using techniques described in this application.

In one embodiment, the camera 140 in FIG. 1 can record a combination of the image 230 in FIG. 2 and at least one of dummy images 210, 220 in FIG. 2. The recorded image can appear as the image 300. The image 300 can be shown hundred times a second for a one-thousandth of a second. The image 300 will be shown for a total of one-tenth of a second, enough for a human eye to process information contained in the image 300. The dummy images will be shown for nine-tenths of a second. In other words, the sequence 200 in FIG. 2 can have 90 dummy images 210, 220 for each image 230 containing sensitive information.

The camera 140 has an exposure rate of approximately one-sixtieth of a second, and during that one-sixtieth of a second, in the worst-case scenario, the camera can record one image 230 and 64 dummy images 210, 220. Consequently, as can be seen in the image 300, the sensitive information 130 is faded out because the amount of time that the camera records the image 230 is much shorter than the amount of time the camera spends recording the dummy images 210, 220.

In another embodiment, the user device 100 in FIG. 1 displaying the information 130 in FIG. 1 can receive an indication that the information 130 is sensitive. Consequently, in one embodiment, the user device 100 can adjust the refresh rate to two or three times the normal refresh rate, thus garbling the image as shown in image 300. Normally the refresh rate can be 60 Hz, 120 Hz, 144 Hz, and even 240 Hz. When the camera 140 records the image 230, if the refresh rate is high, the camera 140 will more likely record a blank image than the sensitive information contained in the information 130. Similarly, in another embodiment, upon receiving the indication that the information 130 is sensitive, the user device 100 can create the sequence of images 200, prior to presenting the sequence of images on the screen.

In addition to, or instead of, receiving the indication that the information 130 is sensitive, the user device 100 can determine that the user device is in a public place, such as an airport, a restaurant, a coffee shop, a stadium, a concert, etc. and can adjust the refresh rate and/or create the sequence 200 in FIG. 2 to reduce the likelihood that the information 130 can be recorded by another user device.

Figure 4:
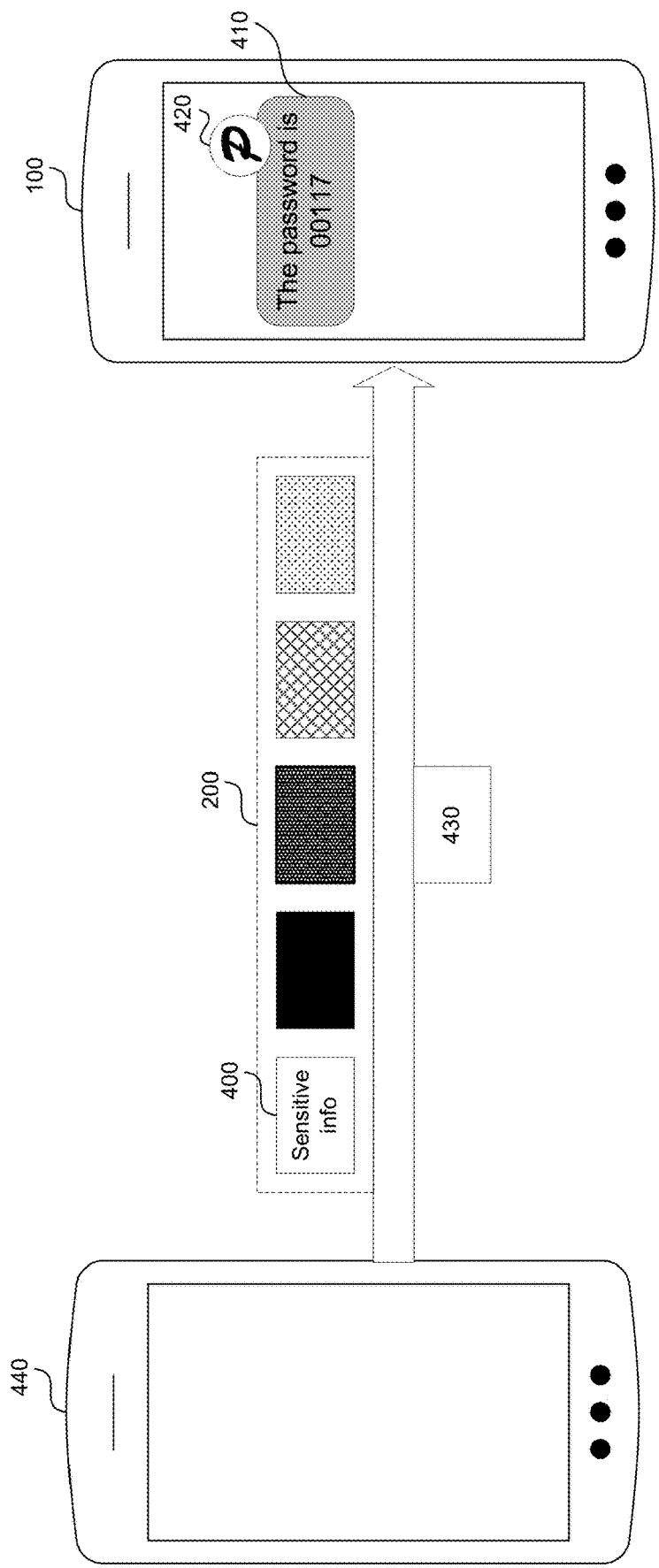
FIG. 4 shows an indication that presented information is private.

FIG. 4 shows an indication that presented information is private. The user device 100 can receive, from a different user device 440, the private information as a sequence of images 200, and/or can receive the private information with indication 430 that the information should be privatized. The user device 100 can privatize information by adjusting the refresh rate of the display, or by creating the sequence of images 200.

The user device 100 can present the private information 400 to the user, and can indicate through color coding 410 or an icon 420 that the presented information is private. For example, if the private information 400 is a text message, the color of the text message can change from the standard blue or green to gold.

Figure 5:
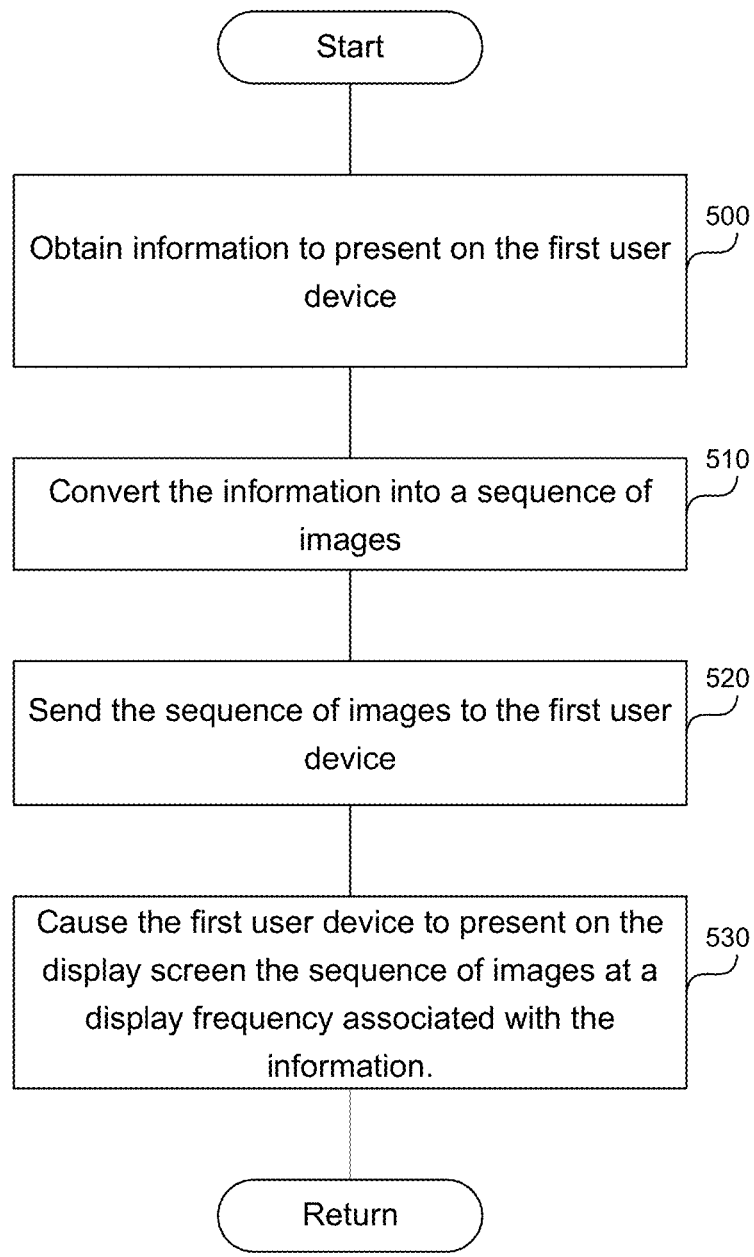
FIG. 5 is a flowchart of a method to prevent recording of a display screen of a first mobile device by a second mobile device.

FIG. 5 is a flowchart of a method to prevent recording of a display screen of a first mobile device by a second mobile device. In step 500, a hardware or software processor executing instructions described in this application can obtain information to present on or send to the first user device, where the information is configured to be presented on the display screen of the first user device. The information can include visual information comprising a text or an image.

In step 510, the processor can convert the information into a sequence of images, such as animated gifs or videos, where one or more images in the sequence of images include the information. The remainder of images in the sequence of images include a visual unrelated to the information. A number of the one or more images and a number of the remainder of images indicate a display frequency associated with the information. The display frequency can include a refresh rate. The number of the remainder of images is greater than the number of the one or more images, for example, by a factor of nine to one as described in this application.

The display frequency exceeds an exposure time associated with a light sensor of the second user device. The light sensor of the second user device can be an image-capture device such as a camera, a rangefinder, an infrared light sensor, or an ultraviolet light sensor. The display frequency causes an observer to form a legible perception of the one or more images. In other words, the display frequency prevents the second user device from making a legible recording of the sensitive information, while enabling a human observer to see the sensitive information, as described in this application.

In step 520, the processor can send the sequence of images to the first user device. For example, in one embodiment, the processor can be associated with a third user device that creates the sequence of images, including the sensitive information, prior to sending the sequence of images to the first user device. In another embodiment, the processor can be associated with the first user device and can create the sequence of images prior to presenting the sensitive information on the screen.

In step 530, the processor can cause the first user device to present on the display screen the sequence of images at the display frequency associated with the information. The display frequency associated with the information causes a garbling of a recording of the display screen associated with the first user device by the second user device, thus enhancing the privacy of the information.

The processor can obtain an indication of the exposure time associated with the light sensor of the second user device. The processor can adjust the number of the one or more images and the number of the remainder of images to present at least two images in the remainder of images for each image among the one or more images during the exposure time associated with the second user device.

The processor can obtain an indication of the exposure time associated with the light sensor of the second user device. The processor can adjust the number of the one or more images and the number of the remainder of images to obtain the display frequency exceeding the indication of the exposure time by at least a factor of two.

The processor can obtain an indication of the exposure time associated with the light sensor of the second user device. The processor can obtain a refresh rate associated with the display screen associated with the first user device. The refresh rate indicates a frequency with which the display screen associated with the first user device is refreshed. The processor can adjust the refresh rate associated with the display screen to exceed the exposure time by a factor of two or more.

The processor can obtain a location associated with the first user device. The processor can determine whether the location indicates a public location, such as an airport, a stadium, a street, etc. Upon determining that the location indicates the public location, the processor can obtain an indication of the exposure time associated with the light sensor of the second user device. The processor can obtain a refresh rate associated with the display screen associated with the first user device. The processor can adjust the refresh rate associated with the display screen to exceed the exposure time by a factor of two or more.

The processor can obtain a default visual appearance associated with the information, such as color. The processor can change the default visual appearance of the sequence of images by adding a color different from the default visual appearance associated with the information. The processor can cause the first user device to present on the display screen the sequence of images including the color different from the default visual appearance associated with the information, thereby indicating that privacy of the information presented on the display screen is enhanced.

Computer System

Figure 6:
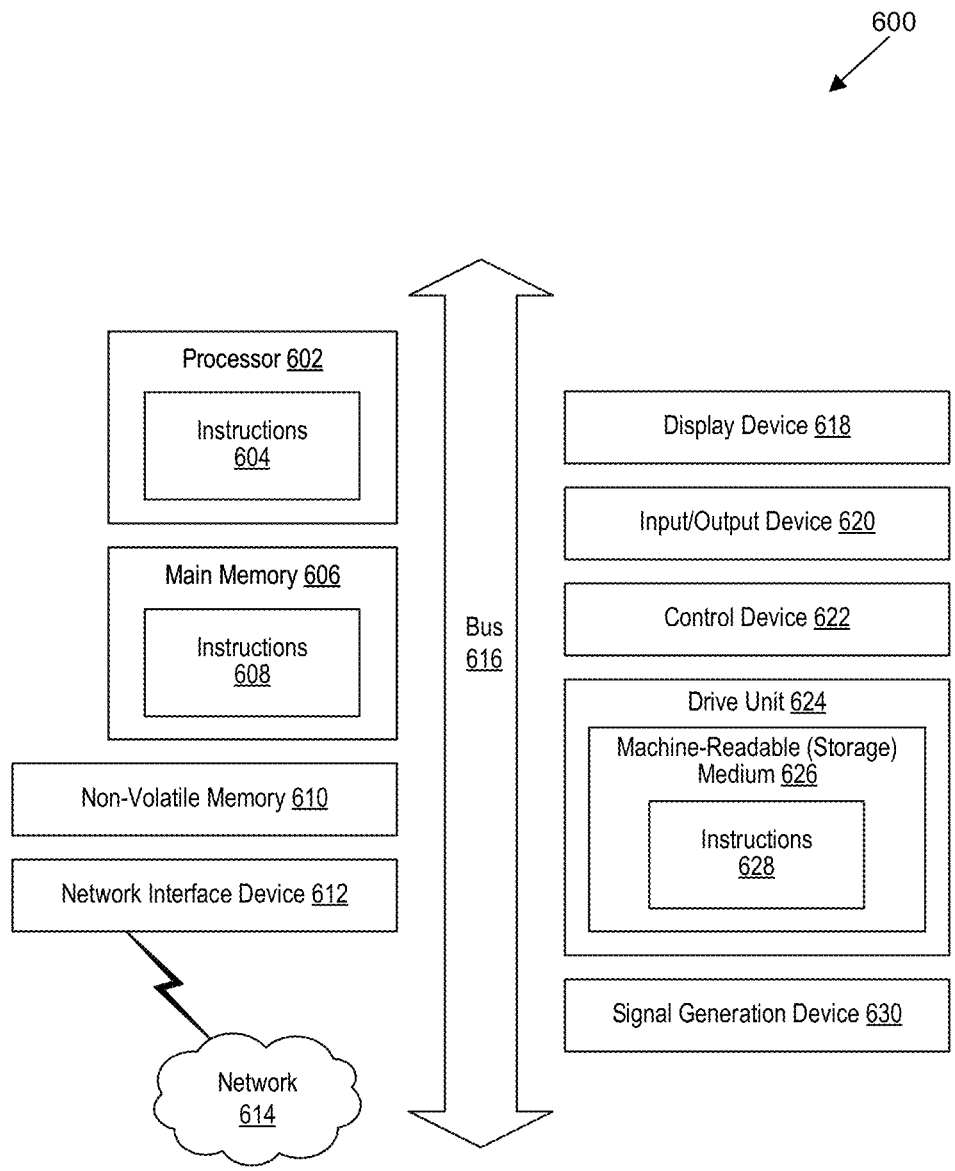
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory computer-readable storage media storing instructions to prevent recording of a displayed object on a first mobile device, which, when executed by at least one data processor of a system, cause the system to:

obtain information to send to the first mobile device,
wherein the information is configured to be presented on a display screen of the first mobile device;

convert the information into a sequence of images,
wherein one or more images in the sequence of images include the information,
wherein a remainder of images in the sequence of images include a visual unrelated to the information,
wherein a number of the one or more images and a number of the remainder of images indicate a display frequency associated with the information, wherein the number of the remainder of images presented each second is greater than the number of the one or more images presented each second, thereby preventing recording of the displayed object through temporal integration of the remainder of images and the one or more images,
  wherein the display frequency exceeds an exposure time associated with an image-capture device, and
  wherein the display frequency causes an observer to form a perception of the one or more images;
send the sequence of images to the first mobile device;
obtain a location associated with the first mobile device;
determine whether the location indicates a public location;
upon determining that the location indicates the public location, obtain an indication of the exposure time associated with the image-capture device;
obtain a refresh rate associated with the display screen associated with the first mobile device,
  wherein the refresh rate indicates a frequency with which the display screen associated with the first mobile device is refreshed;
adjust the refresh rate associated with the display screen to exceed the exposure time; and
cause the first mobile device to present on the display screen the sequence of images at the the adjusted refresh rate,
  wherein the adjusted refresh rate causes a garbling of a recording of the displayed object associated with the first mobile device by the image-capture device.

2. The one or more non-transitory computer-readable storage media of claim 1, comprising instructions to:
obtain a default visual appearance associated with the information;
change a default visual appearance of the sequence of images by adding a color different from the default visual appearance associated with the information; and
cause the first mobile device to present on the display screen the sequence of images including the color different from the default visual appearance associated with the information, thereby indicating that privacy of the information presented on the display screen is enhanced.

3. The one or more non-transitory computer-readable storage media of claim 1, comprising instructions to:
obtain an indication of the exposure time associated with the image-capture device; and
adjust the number of the one or more images and the number of the remainder of images to present at least two images in the remainder of images for each image among the one or more images during the exposure time associated with the image-capture device.

4. The one or more non-transitory computer-readable storage media of claim 1, comprising instructions to:
obtain an indication of the exposure time associated with the image-capture device; and
adjust the number of the one or more images and the number of the remainder of images to obtain the display frequency exceeding the indication of the exposure time by at least a factor of two.

5. The one or more non-transitory computer-readable storage media of claim 1, comprising instructions to:
obtain an indication of the exposure time associated with the image-capture device;
obtain the refresh rate associated with the display screen associated with the first mobile device,
  wherein the refresh rate indicates the frequency with which the display screen associated with the first mobile device is refreshed; and
adjust the refresh rate associated with the display screen to exceed the exposure time.

6. The one or more non-transitory computer-readable storage media of claim 1, wherein the information includes visual information comprising a text or an image.

7. The one or more non-transitory computer-readable storage media of claim 1, wherein the image-capture device includes a camera, a rangefinder, an infrared light sensor, or an ultraviolet light sensor.

8. A method comprising:
obtaining information to present on a first user device,
  wherein the information is configured to be presented on a display screen of the first user device;
converting the information into a sequence of images,
  wherein one or more images in the sequence of images include the information,
  wherein a remainder of images in the sequence of images include a visual unrelated to the information,
  wherein a number of the one or more images and a number of the remainder of images indicate a display frequency associated with the information,
  wherein the number of the remainder of images presented each second is greater than the number of the one or more images presented each second, thereby preventing recording of the information through temporal integration of the remainder of images and the one or more images,
  wherein the display frequency exceeds an exposure time associated with a light sensor of a second user device, and
  wherein the display frequency causes an observer to form a perception of the one or more images; and
obtaining a location associated with the first user device;
determining whether the location indicates a public location;
upon determining that the location indicates the public location, obtaining an indication of the exposure time associated with the light sensor of the second user device;
obtaining a refresh rate associated with the display screen associated with the first user device,
  wherein the refresh rate indicates a frequency with which the display screen associated with the first user device is refreshed;
adjusting the refresh rate associated with the display screen to exceed the exposure time; and
causing the first user device to present on the display screen the sequence of images at the adjusted refresh rate
  wherein the adjusted refresh rate causes a garbling of a recording of the display screen associated with the first user device by the second user device.

9. The method of claim 8, comprising:
obtaining an indication of the exposure time associated with the light sensor of the second user device; and
adjusting the number of the one or more images and the number of the remainder of images to present at least two images in the remainder of images for each image among the one or more images during the exposure time associated with the second user device.

10. The method of claim 8, comprising:
obtaining an indication of the exposure time associated with the light sensor of the second user device; and adjusting the number of the one or more images and the number of the remainder of images to obtain the display frequency exceeding the indication of the exposure time by at least a factor of two.

11. The method of claim 8, comprising:
obtaining an indication of the exposure time associated with the light sensor of the second user device;
obtaining the refresh rate associated with the display screen associated with the first user device,
   wherein the refresh rate indicates the frequency with which the display screen associated with the first user device is refreshed; and
adjusting the refresh rate associated with the display screen to exceed the exposure time.

12. The method of claim 8, comprising:
obtaining a default visual appearance associated with the information;
changing a default visual appearance of the sequence of images by adding a color different from the default visual appearance associated with the information; and
causing the first user device to present on the display screen the sequence of images including the color different from the default visual appearance associated with the information, thereby indicating that privacy of the information presented on the display screen is enhanced.

13. A system comprising:
one or more hardware processors; and
one or more non-transitory memories storing instructions, which, when executed by the one or more hardware processors, cause the system to:
   obtain information to present on a first user device,
      wherein the information is configured to be presented on a display screen of the first user device;
   convert the information into a sequence of images,
      wherein one or more images in the sequence of images include the information,
      wherein a remainder of images in the sequence of images include a visual unrelated to the information,
      wherein a number of the one or more images and a number of the remainder of images indicate a display frequency associated with the information,
      wherein the number of the remainder of images presented each second is greater than the number of the one or more images presented each second, thereby preventing recording of the information through temporal integration of the remainder of images and the one or more images,
      wherein the display frequency exceeds an exposure time associated with a light sensor of a second user device, and
      wherein the display frequency causes an observer to form a perception of the one or more images; and
   obtain a location associated with the first user device;
   determine whether the location indicates a public location; and
   upon determining that the location indicates the public location, obtain an indication of the exposure time associated with the light sensor of the second user device;
   obtain a refresh rate associated with the display screen associated with the first user device,
      wherein the refresh rate indicates a frequency with which the display screen associated with the first user device is refreshed;
   adjust the refresh rate associated with the display screen to exceed the exposure time;
   cause the first user device to present on the display screen the sequence of images at the adjusted refresh rate,
      wherein the adjusted refresh rate causes a garbling of a recording of the display screen associated with the first user device by the second user device.

14. The system of claim 13, comprising instructions to:
obtain an indication of the exposure time associated with the light sensor of the second user device; and
adjust the number of the one or more images and the number of the remainder of images to present at least two images in the remainder of images for each image among the one or more images during the exposure time associated with the second user device.

15. The system of claim 13, comprising instructions to:
obtain an indication of the exposure time associated with the light sensor of the second user device; and
adjust the number of the one or more images and the number of the remainder of images to obtain the display frequency exceeding the indication of the exposure time by at least a factor of two.

16. The system of claim 13, comprising instructions to:
obtain an indication of the exposure time associated with the light sensor of the second user device;
obtain the refresh rate associated with the display screen associated with the first user device,
   wherein the refresh rate indicates the frequency with which the display screen associated with the first user device is refreshed; and
adjust the refresh rate associated with the display screen to exceed the exposure time.

17. The system of claim 13, wherein the information includes visual information comprising a text or an image.

18. The system of claim 13, comprising instructions to:
obtain a default visual appearance associated with the information;
change a default visual appearance of the sequence of images by adding a color different from the default visual appearance associated with the information; and
cause the first user device to present on the display screen the sequence of images including the color different from the default visual appearance associated with the information, thereby indicating that privacy of the information presented on the display screen is enhanced.

* * * * *